United States Patent
Hayakawa et al.

(10) Patent No.: US 9,009,047 B2
(45) Date of Patent: Apr. 14, 2015

(54) SPECIFIC CALL DETECTING DEVICE AND SPECIFIC CALL DETECTING METHOD

(71) Applicant: Fujitsu Limited, Kawasaki-shi (JP)

(72) Inventors: Shoji Hayakawa, Akashi (JP); Naoshi Matsuo, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 13/708,021

(22) Filed: Dec. 7, 2012

(65) Prior Publication Data

US 2013/0197912 A1 Aug. 1, 2013

(30) Foreign Application Priority Data

Jan. 31, 2012 (JP) .................................. 2012-18284

(51) Int. Cl.
  *G10L 15/05* (2013.01)
  *G10L 17/00* (2013.01)
  *H04M 3/22* (2006.01)
  *G10L 25/48* (2013.01)
  *G10L 17/26* (2013.01)

(52) U.S. Cl.
  CPC ........... *G10L 17/005* (2013.01); *H04M 3/2281* (2013.01); *G10L 25/48* (2013.01); *G10L 17/26* (2013.01); *H04M 2250/74* (2013.01)

(58) Field of Classification Search
  USPC ................................. 704/231–145, 251–257
  See application file for complete search history.

(56) References Cited

U.S. PATENT DOCUMENTS

| 7,284,128 | B2 | 10/2007 | Sako |
| 8,165,874 | B2 | 4/2012 | Kurata et al. |
| 2011/0282662 | A1* | 11/2011 | Aonuma et al. ............... 704/231 |

FOREIGN PATENT DOCUMENTS

| JP | 10-155163 | 6/1998 |
| JP | 2002-202787 | 7/2002 |
| JP | 2006-196949 | 7/2006 |
| JP | 2007-096962 | 4/2007 |
| JP | 2008-210085 | 9/2008 |
| JP | 2009-216840 | 9/2009 |

* cited by examiner

*Primary Examiner* — Abul Azad
(74) *Attorney, Agent, or Firm* — Fujitsu Patent Center (57) ABSTRACT

A specific call detecting device includes: an utterance period detecting unit which detects at least a first utterance period in which the first speaker speaks in a call between a first speaker and a second speaker; an utterance ratio calculating unit which calculates utterance ratio of the first speaker in the call; a voice recognition execution determining unit which determines whether at least one of the first voice of the first speaker and second voice of the second speaker becomes a target of voice recognition or not on the basis of the utterance ratio of the first speaker; a voice recognizing unit which detects a keyword related to a specific call from the voice determined as a target of voice recognition among the first and second voices; and a determining unit which determines whether the call is the specific call or not on the basis of the detected keyword.

27 Claims, 7 Drawing Sheets

SPECIFIC CALL DETECTING DEVICE AND SPECIFIC CALL DETECTING METHOD

CROSS-REFERENCE TO RELATED APPLICATION

This application is based upon and claims the benefit of priority of the prior Japanese Patent Application No. 2012-18284, filed on Jan. 31, 2012, and the entire contents of which are incorporated herein by reference.

FIELD

The embodiments discussed herein are related to a specific call detecting device and a specific call detecting method for determining whether the contents of a call include specific content on the basis of a plurality of speakers during a call.

BACKGROUND

In recent years, fraud and malicious solicitation, using a telephone line are becoming social problems. To address these problems, techniques of detecting a call related to such a fraud by recognizing a voice during a call via a telephone line have been proposed (refer to, for example, Japanese Laid-open Patent Publication Nos. 2007-96962, 2008-210085, and 2006-196949).

For example, a telephone device disclosed in Japanese Laid-open Patent Publication No. 2007-96962 converts voice of a caller into a character string, compares keywords with the character string, and counts the number of matches for each keyword. When a plurality of keywords match the character strings, the telephone device determines that the call is made by a swindler.

A billing fraud preventing system disclosed in Japanese Laid-open Patent Publication No. 2008-210085 checks voice characteristics on the basis of voice data received from a user telephone terminal and voice data of preliminarily registered swindlers. The system converts the call voice data to a text and checks to see whether account information included in the text-converted call content matches with account information for fraud which is preliminarily registered. Further, the system calculates match rate between pre-registered keywords and keywords included in the text-converted call content. The system determines the determination level on the basis of the voice characteristics, account information, and match rate.

Further, in a telephone with a call content warning disclosed in Japanese Laid-open Patent Publication No. 2006-196949, when a pre-registered word is detected from content of a call recorded, information of the detection result is notified as a warning to the outside.

In those techniques, voice recognizing process is continuously executed on voice of at least one of speakers during a call. Consequently, process load caused by executing the voice recognition is heavy. On the other hand, a technique for reducing the process load of the voice recognition device has been proposed (refer to, for example, Japanese Laid-open Patent Publication No. H10-155163). A telephone disclosed in Japanese Laid-open Patent Publication No. H10-155163 detects whether a transmitter-side voice signal is a sound signal or not, detects whether a receiver-side voice signal is a silence signal or not, and applies the voice recognition to a transmitter-side voice signal and a receiver-side voice signal which have been applied time-division process on the basis of the detection result.

However, when only one voice of a speaker is determined as a target of recognition, even when another speaker utters a keyword for determining whether a call is a call to be detected or not, it is difficult to detect the keyword. As a result, the precision of detecting a call of specific content may deteriorate. In addition, when a sound signal is a target of voice recognition, most of voice uttered by the speaker becomes a target of voice recognition. Consequently, reduction in process load may be insufficient.

SUMMARY

According to one embodiment, a specific call detecting device is provided. The specific call detecting device includes: an utterance period detecting unit which detects at least a first utterance period in a call between a first speaker and a second speaker, from among the first utterance period in which the first speaker speaks from a first voice uttered by the first speaker and obtained by a voice input unit, and a second utterance period in which the second speaker speaks from a second voice uttered by the second speaker; an utterance ratio calculating unit which calculates utterance ratio of the first speaker in the call on the basis of at least the first utterance period among the first and second utterance periods; a voice recognition execution determining unit which determines whether at least one of the first and second voices is to be a target of voice recognition or not on the basis of the utterance ratio; a voice recognizing unit which detects a keyword related to a specific call from the voice determined as a target of voice recognition among the first and second voices; and a determining unit which calculates an evaluation value so that the larger the number of keywords detected is, the higher the evaluation value indicative of probability of the specific call is, and when the evaluation value is equal to or higher than a predetermined threshold, determines that the call is the specific call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, specific call detecting devices according to various embodiments will be described with reference to the drawings.

In the embodiments, a specific call detecting device regards harmful calls such as a call aimed at a fraud and a call aiming at malicious solicitation as specific calls to be detected.

As a result of keen study, the inventors have found that when a harmful call is made between a victim and a victimizer via a telephone line, the ratio of utterance periods of the victim in the call is lower than that when a normal conversation is made. The reason is that a victimizer utters various words to conduct a fraud or the like whereas most words uttered by a victim are replies such as "yes".

The specific call detecting device obtains utterance periods in which each speaker speaks and, on the basis of the utterance ratio of one of the speakers in a call, determines whether there is the possibility that a harmful call is being made or not. Only when it is determined that there is the possibility that a harmful call is being made, the specific call detecting device executes voice recognizing process on the voice of at least one of the speakers.

In the embodiment, the specific call detecting device is assembled in a cellular phone or a fixed telephone and determines whether a call between a plurality of speakers made by a telephone line is a harmful call or not.

Figure 1:
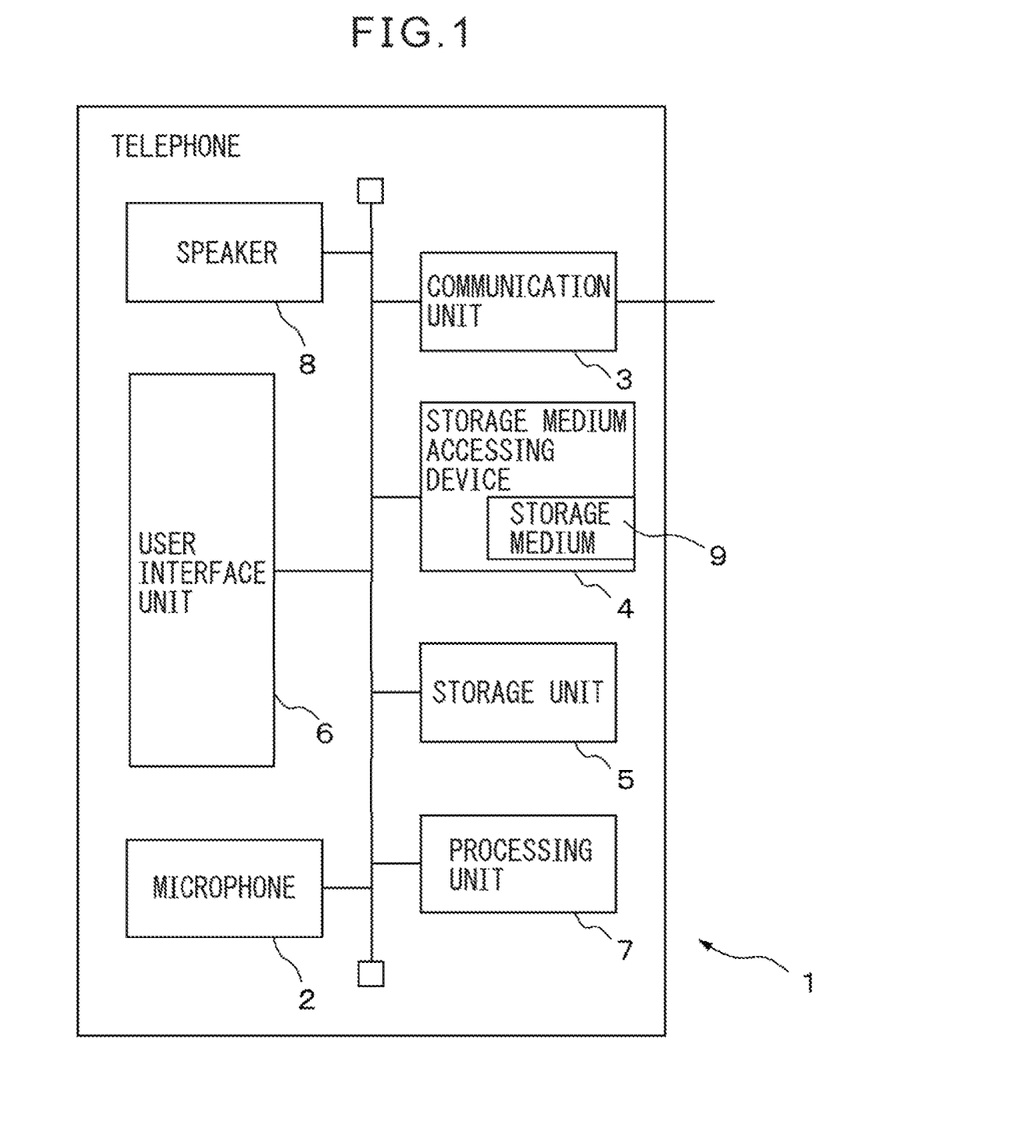
FIG. 1 is a schematic configuration diagram of a telephone in which a specific call detecting device according to a first embodiment is installed.

FIG. 1 is a schematic configuration diagram of a telephone in which a specific call detecting device according to an embodiment is installed. In the embodiment, a telephone 1 includes a microphone 2, a communication unit 3, a storage medium accessing device 4, a storage unit 5, a user interface unit 6, a processing unit 7, and a speaker 8. The telephone 1 may be either a fixed telephone or a cellular phone.

The microphone 2 is an example of a voice input unit and obtains data of voice uttered by a first speaker. The first speaker is a speaker who may be victimized by a harmful call. The microphone 2 collects voice uttered by the first speaker who is around the microphone 2, generates an analog voice signal, and outputs the analog voice signal to an analog-digital converter (not illustrated). The analog-digital converter digitalizes the analog voice signal by sampling the analog voice signal according to a predetermined sampling cycle to generate an uplink voice signal. The analog-digital converter outputs the uplink voice signal to the processing unit 7 connected to the analog-digital converter.

The communication unit 3 is another example of the voice input unit and includes an interface circuit for connecting the telephone 1 to a telephone line. The communication unit 3 receives a data stream including a downlink voice signal which is an electric signal obtained by converting voice uttered by a second speaker via the telephone line. The second speaker is a speaker who may have intention to harm the first speaker by a harmful call. The communication unit 3 extracts the downlink voice signal from the data stream. When the downlink voice signal has been coded by a predetermined channel coding method, the communication unit 3 decodes the coded downlink voice signal in accordance with the channel coding method. The communication unit 3 outputs the downlink voice signal to the processing unit 7.

The storage medium accessing device 4 is, for example, a device for accessing a storage medium 9 such as a semiconductor memory card. The storage medium accessing device 4, for example, reads a computer program to be executed on the processing unit 7 stored in the storage medium 9 and transfers it to the processing unit 7. The storage medium accessing device 4 may read a computer program for detecting a specific call from the storage medium 9 and transfer it to the processing unit 7.

The storage unit 5 includes, for example, a readable/writable nonvolatile semiconductor memory and a readable/writable volatile semiconductor memory. The storage unit 5 stores various application programs executed on the processing unit 7 and various data. The storage unit 5 may store a computer program for executing a specific call detecting process and various data used for the specific call detecting process. Further, the storage unit 5 may store a voice signal obtained by the microphone 2 or the communication unit 3.

The user interface unit 6 includes, for example, an input device such as a plurality of operation keys and a display device such as a liquid crystal display. Alternately, the user interface unit 6 may include a device in which the input device and the display device are integrated such as a touch panel display. The user interface unit 6 generates an operation signal according to an operation on the input device by the first speaker and outputs the operation signal to the processing unit 7. The user interface unit 6 displays various information received from the processing unit 7 on the display device. Further, the user interface unit 6 may receive a warning message when the processing unit 7 detects a specific call from the processing unit 7 and display the warning message on the display device.

The processing unit 7 includes one or plural processors, a memory circuit, and a peripheral circuit. The processing unit 7 is connected to each of the units of the telephone 1 via signal lines and controls the units in the telephone 1. The processing unit 7 makes call setting in accordance with an operation of the user or reception of a call signal and executes various processes for maintain communication. The processing unit 7 stores time of start of a call into the storage unit 5. The processing unit 7 executes various processes for transmitting the uplink voice signal received from the microphone 2 to a telephone line via the communication unit 3, and various processes for reproducing the downlink voice signal received from the telephone line via the speaker 8.

The processing unit 7 is an example of a specific call detecting device and determines, on the basis of voice uttered by at least one of first and second speakers, whether a call between the first and second speakers is a specific call or not.

Figure 2:
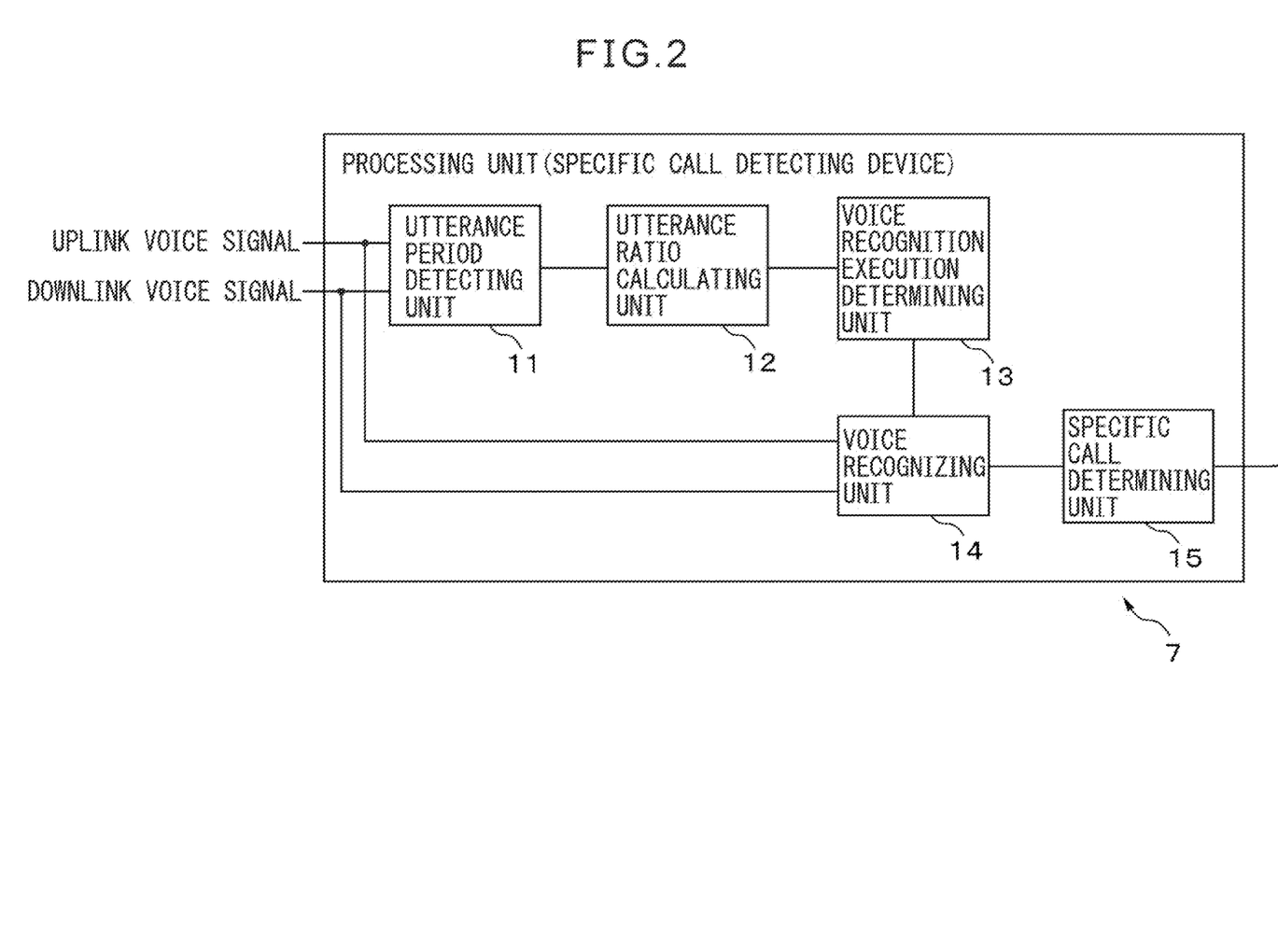
FIG. 2 is a functional block diagram of a processing unit of the telephone in which the specific call detecting device according to the first embodiment is installed.

FIG. 2 is a functional block diagram of the processing unit 7 related on detection of a specific call. The processing unit 7 includes an utterance period detecting unit 11, an utterance ratio calculating unit 12, a voice recognition execution determining unit 13, a voice recognizing unit 14, and a specific call determining unit 15.

The units of the processing unit 7 are, for example, functional modules realized by a computer program which operates on a processor of the processing unit 7. The units of the processing unit 7 may be installed as separate circuits in the telephone 1 or installed as a single integrated circuit realizing the functions of the units separately from the processor 7 in the telephone 1.

The utterance period detecting unit 11 divides each of the uplink voice signal and the downlink voice signal into frames.

Each frame has a predetermined length. The frame length is set, for example, from 10 msec to 100 msec. The utterance period detecting unit 11 detects a frame, which includes voice signal uttered by the first speaker, in frames of the uplink voice signal, thereby detecting a first utterance period as a period in which the first speaker speaks. Similarly, the utterance period detecting unit 11 detects a frame in which the second speaker utters voice in frames of the downlink voice signal, thereby detecting a second utterance period as a period in which the second speaker speaks. The process of detecting a frame, which includes voice signal uttered by the first speaker, from an uplink voice signal and the process of detecting a frame in which the second speaker utters voice from a downlink voice signal can be made the same process. Hereinafter, using an uplink voice signal as an example, the process of detecting a frame, which includes voice signal uttered by the first speaker, will be described.

Generally, the power of an uplink voice signal in a frame, which includes voice signal uttered by the first speaker, is larger than that of an uplink voice signal in a frame in which the first speaker does not utter voice. Consequently, for example, the utterance period detecting unit 11 converts the uplink voice signal of a time domain to a spectral signal of a frequency domain using time-frequency transform. The utterance period detecting unit 11 can use, as the time-frequency transform, for example, fast Fourier transform (FFT) or modified discrete cosign transform (MDCT). The utterance period detecting unit 11 obtains the power of each frequency band by squaring the spectral signal of the frequency band, and calculates an average value of the powers in all of the frequency bands. The utterance period detecting unit 11 detects a frame whose average value is larger than a predetermined power threshold as a frame, which includes voice signal uttered by the first speaker. The power threshold is set to, for example, a value obtained by adding a predetermined offset to the power of background noise. The power of background noise may be, for example, preliminarily set or updated on the frame unit basis. For example, the utterance period detecting unit 11 updates the power of background noise by adding a value, which is obtained by multiplying the power average value of a frame whose power average value is equal to or less than the power threshold with a forgetting factor $\alpha$ (for example, $\alpha=0.01$), to a value, which is obtained by multiplying the power of background noise at the time point with $(1-\alpha)$.

The utterance period detecting unit 11 may determine whether each frame is a frame, which includes voice signal uttered by the first speaker, or not by another method of detecting an utterance period. For example, the utterance period detecting unit 11 calculates, as a zero crossing number, the number of times that a time change curve of the signal value of the uplink voice signal crosses zero with respect to a frame whose power average value is larger than the power threshold. Only when the zero crossing number is smaller than a predetermined threshold, the utterance period detecting unit 11 may determine the frame as a frame, which includes voice signal uttered by the first speaker. Since a predetermined frequency component called formant frequency is larger than the components of other frequencies in human voice, the zero crossing number is largely influenced by the formant frequency. On the other hand, since the frequency components of various sounds are mixed, the zero crossing number in the background noise is larger than that in human voice.

Generally, the sound source of the background noise is far from the microphone 2 more than the first speaker, and therefore the possibility that the amplitude corresponding to the background noise is smaller than that corresponding to the voice of the first speaker is high. The utterance period detecting unit 11 may obtain the zero crossing number by calculating only the point at which the value of the uplink voice signal becomes zero immediately after the absolute value of the uplink voice signal becomes larger than a predetermined threshold in each frame. In this case, the utterance period detecting unit 11 may determine a frame in which the zero crossing number is smaller than a predetermined threshold as a frame, which includes voice signal uttered by the first speaker, regardless of the powers of frames.

As another modification, the utterance period detecting unit 11 may obtain the maximum value among peak values of the autocorrelation function or modified autocorrelation function (except for the peak value of time difference zero) with respect to frames whose power average values are larger than the power threshold. The degree of the autocorrelation in a frame corresponding to human voice is relatively high whereas the degree of the autocorrelation in a frame corresponding to background noise is low. Consequently, the utterance period detecting unit 11 may determine only a frame in which the maximum value of the peak value is larger than a predetermined threshold as a frame, which includes voice signal uttered by the first speaker. The autocorrelation function is obtained by performing inverse Fourier transform on the power of each frequency band (power spectral density). The modified autocorrelation function is obtained by performing inverse Fourier transform on a value obtained by filtering the power spectral density with a linear prediction coding filter.

The utterance period detecting unit 11 detects a sound period in which frames determined as frames, which include voice signal uttered by the first speaker, are continuous with respect to the uplink sound signal. Each time the sound period is detected, the utterance period detecting unit 11 sets the sound period as a first utterance period. Similarly, the utterance period detecting unit 11 detects a sound period in which frames determined as frames, which include voice signal uttered by the second speaker, are continuous with respect to the downlink voice signal. Each time the sound period is detected, the utterance period detecting unit 11 sets the sound period as a second utterance period.

Each time the first utterance period or the second utterance period is detected, the utterance period detecting unit 11 stores start time and end time of the utterance period into the storage unit 5.

For each of frame, the utterance ratio calculating unit 12 calculates a first utterance ratio indicative of a ratio of period that the first speaker speaks in a call to a period from the start of the call until the frame. For example, the utterance ratio calculating unit 12 calculates the utterance ratio $talk_{ratio}(n)$ of the first speaker by the following equation, $$talk_{ratio}(n) = \frac{sum_{user}(n)}{sum_{user}(n) + sum_{party}(n)} \quad (1)$$

where "n" denotes the number of frames from the start of a call until the present frame. $sum_{user}(n)$ denotes sum of the first utterance periods by the first speaker from the start of a call until the present frame. $sum_{party}(n)$ denotes sum of the second utterance periods by the second speaker from the start of a call until the present frame.

The utterance ratio calculating unit 12 may calculate the utterance ratio of the first speaker by the equation (1) in a predetermined period in which the present frame is as the termination end. The predetermined period is set to, for example, 5 minutes to 10 minutes. By the setting, the utterance ratio calculating unit 12 can reduce the influence on the utterance ratio by a conversation which is made not only in a harmful call such as greetings made at the start of a call.

The utterance ratio calculating unit 12 notifies the voice recognition execution determining unit 13 of the utterance ratio talk$_{ratio}$ (n) of the first speaker.

When there is high possibility that the call which is presently being made is a harmful call, the voice recognition execution determining unit 13 makes the voice recognizing unit 14 execute voice recognition on at least one of the uplink voice signal and the downlink voice signal. First, time transition of the utterance ratio of the first speaker in each of a harmful call and a non-harmful call will be described using an example.

Figure 3A:
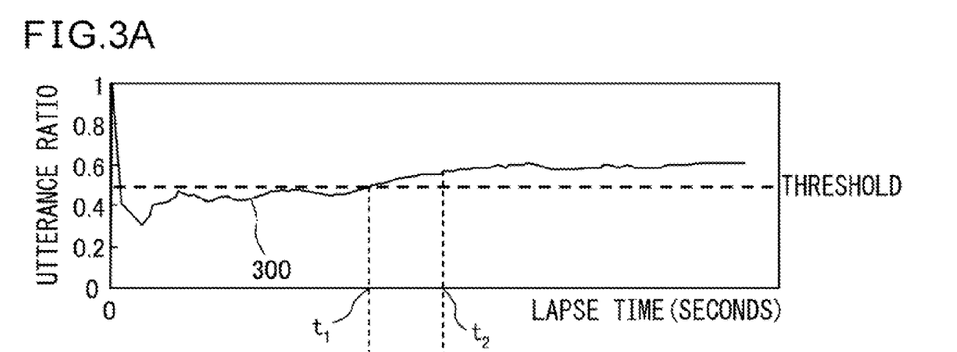
FIG. 3A is a diagram illustrating an example of time transition of utterance ratio in a non-harmful call.
Figure 3B:
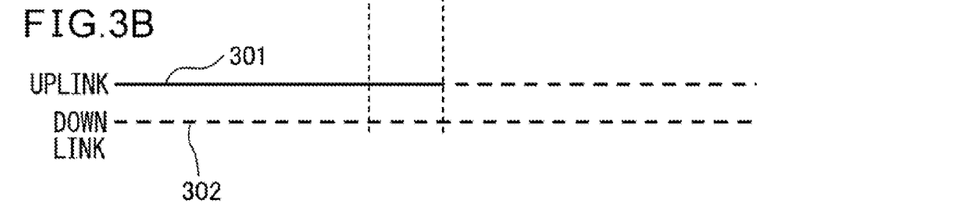
FIG. 3B is a diagram illustrating an example of the relation between the utterance ratio illustrated in FIG. 3A and periods in which voice recognizing process is performed on an uplink voice signal and a downlink voice signal.

FIG. 3A is a diagram illustrating an example of time transition of the utterance ratio of the first speaker with respect to a non-harmful call. FIG. 3B is a diagram illustrating an example of the relation between the utterance ratio illustrated in FIG. 3A and periods in which voice recognizing process is performed on an uplink voice signal and a downlink voice signal by the specific call detecting device of the embodiment. In FIGS. 3A and 3B, the horizontal axis indicates time elapsed since start of a call. In FIG. 3A, the vertical axis indicates the utterance ratio. A graph 300 expresses time transition of the utterance ratio. In FIG. 3B, a line 301 indicates a period in which voice recognition is performed on an uplink voice signal, and a line 302 indicates a period in which voice recognition is performed on a downlink voice signal. In the lines 301 and 302, a part expressed by solid line corresponds to a period in which voice recognition is performed, and a part expressed by dotted line corresponds to a period in which voice recognition is not performed.

As illustrated in the graph 300, in a period until some time elapses since start of a call, changes in the utterance ratio of the first speaker are large, and it is difficult to determine whether the call is a harmful call or not on the basis of the utterance ratio. However, after time $t_2$ after lapse of a predetermined period from time $t_1$ at which the utterance ratio exceeds a threshold, the utterance ratio is almost constant. After the time $t_2$, the utterance ratio remains higher than the threshold. It is therefore estimated that the first speaker utters various words not only just replies. As described above, in a harmful call by which the first speaker becomes a victim, the tendency that the first speaker only replies is high and, this results in low utterance ratio of the first speaker. Considering the fact, after time $t_2$, the possibility that the call is a harmful call is low. As illustrated in FIG. 3B, before the time $t_2$, voice recognition is executed only on the uplink voice signal, i.e., the voice of the first speaker. On the other hand, after the time $t_2$, the voice recognition is not executed on any of the uplink voice signal and the downlink voice signal.

Figure 4A:
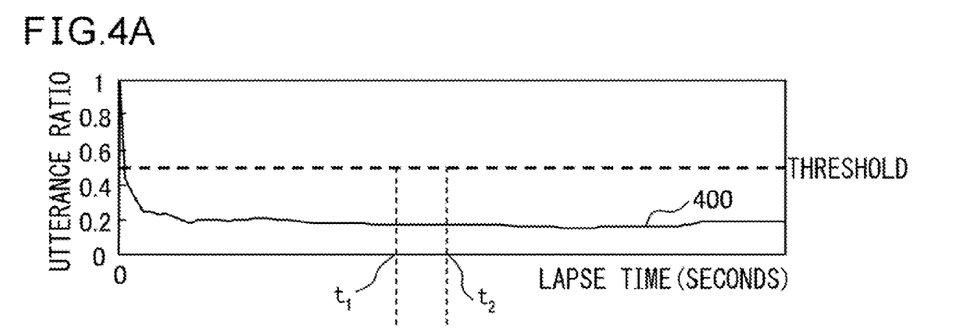
FIG. 4A is a diagram illustrating an example of time transition of the utterance ratio in a harmful call.
Figure 4B:
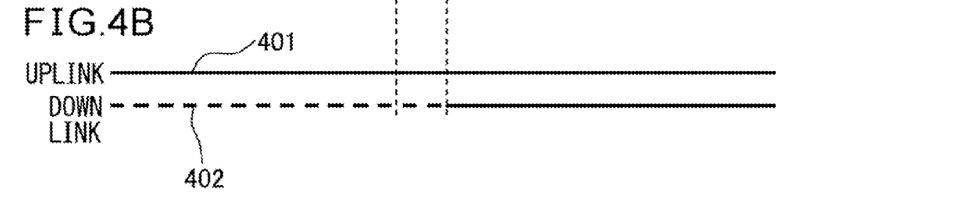
FIG. 4B is a diagram illustrating an example of the relation between the utterance ratio illustrated in FIG. 4A and periods in which voice recognizing process is performed on an uplink voice signal and a downlink voice signal.

FIG. 4A is a diagram illustrating an example of time transition of the utterance ratio in a harmful call. FIG. 4B is a diagram illustrating an example of the relation between the utterance ratio illustrated in FIG. 4A and periods in which voice recognizing process is performed on an uplink voice signal and a downlink voice signal by the specific call detecting device according to the embodiment. In FIGS. 4A and 4B, the horizontal axis expresses time lapsed from the start of a call. In FIG. 4A, the vertical axis indicates the utterance ratio. A graph 400 expresses time transition of the utterance ratio of the first speaker. In FIG. 4B, a line 401 indicates a period in which the voice recognition is performed on the uplink voice signal. A line 402 indicates a period in which the voice recognition is performed on the downlink voice signal. The parts expressed by solid lines in the lines 401 and 402 correspond to periods in which the voice recognition is performed, and a part expressed by the dotted line corresponds to a period in which the voice recognition is not performed.

As illustrated by the graph 400, also at the time t1 at which the utterance ratio exceeds the threshold in FIG. 3A, the utterance ratio is lower than the threshold and is almost constant. It is therefore estimated that the possibility that the first speaker makes a simply reply is high. In this case, the possibility that the call is a harmful call is high. As illustrated in FIG. 4B, consequently, the voice recognition is executed continuously to the uplink voice signal. Also for the downlink voice signal, the voice recognition is executed after the time $t_2$ which is after lapse of a predetermined period since the time $t_1$.

After lapse of a predetermined period since start of a call as described above, when the utterance ratio talk$_{ratio}$(n) of the first speaker is low, the possibility that the call is harmful is high. Therefore, the voice recognition execution determining unit 13 determines whether the voice recognition for the uplink voice signal and the downlink voice signal is executed or not on the basis of the utterance ratio talk$_{ratio}$(n) on the frame unit basis.

Figure 5:
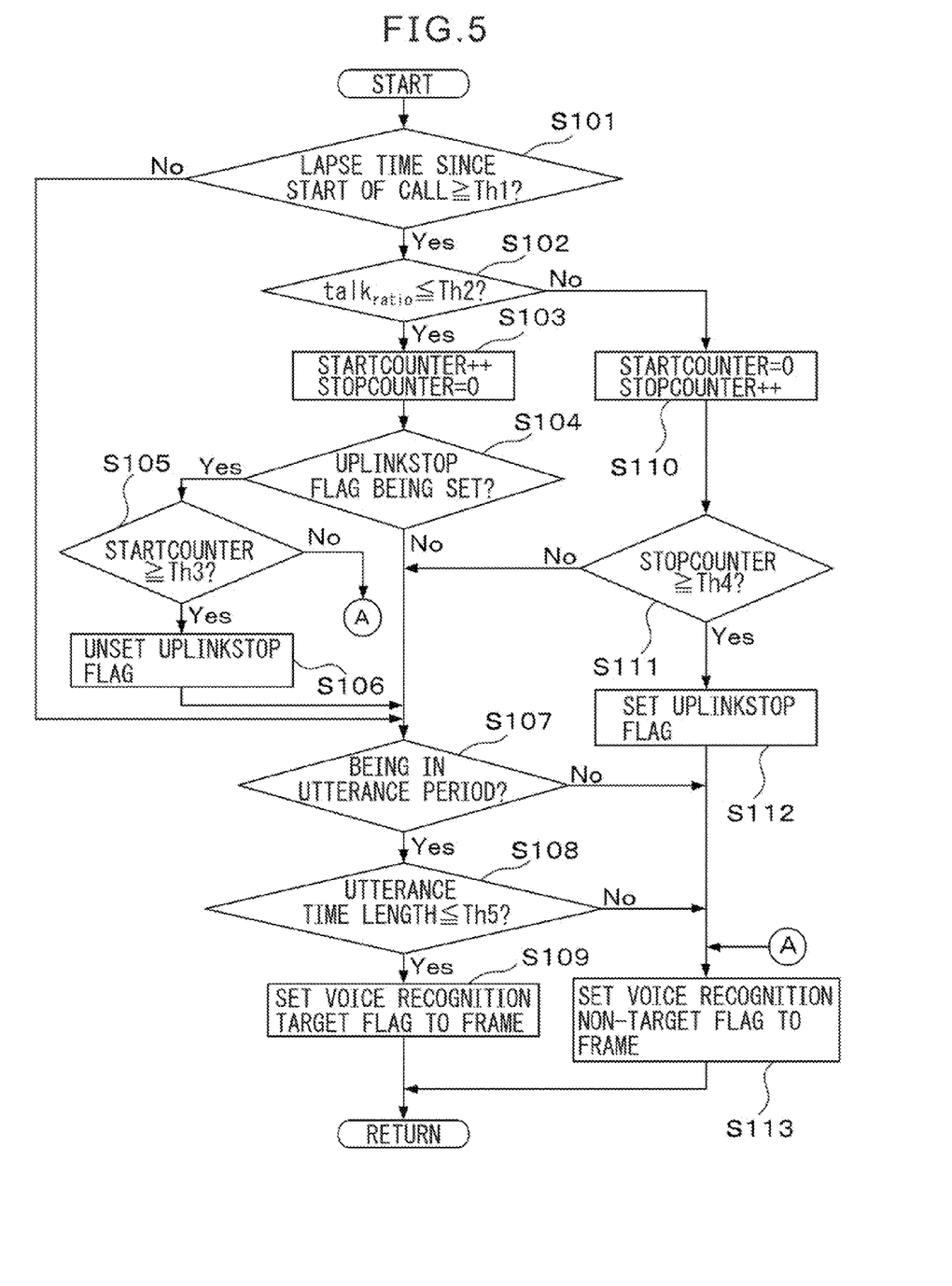
FIG. 5 is an operation flowchart of voice recognition execution determining process on an uplink voice signal, executed by a voice recognition execution determining unit.

FIG. 5 is an operation flowchart of voice recognition execution determining process on an uplink voice signal, executed by the voice recognition execution determining unit 13. According to the operation flowchart, the voice recognition execution determining unit 13 determines whether the voice recognition is executed or not on the frame unit basis.

The voice recognition execution determining unit 13 determines whether lapse time since the start of a call becomes equal to or larger than threshold Th1 or not (step S101). The threshold Th1 is set to, for example, a period in which the utterance ratio talk$_{ratio}$(n) will become substantially constant, such as 100 seconds to 300 seconds. When the lapse time is equal to or larger than the threshold Th1 (Yes in step S101), the voice recognition execution determining unit 13 determines whether the utterance ratio talk$_{ratio}$(n) of the first speaker is equal to or less than threshold Th2 (step S102). The threshold Th2 is set to, for example, the upper limit value of the utterance ratio of a victim in a harmful call such as 0.5 or a value obtained by multiplying 0.5 with a safety coefficient which is less than 1 (for example, 0.9 to 0.95). The upper limit value may be experimentally set, for example, in a range of 0 to 0.5 by analyzing samples of a plurality of harmful calls.

When the utterance ratio talk$_{ratio}$(n) is equal to or less than the threshold Th2 (Yes in step S102), the voice recognition execution determining unit 13 increments STARTCOUNTER by one. The voice recognition execution determining unit 13 resets STOPCOUNTER to zero (step S103). STARTCOUNTER expresses the number of successive frames in which the utterance ratio talk$_{ratio}$(n) is equal to or less than the threshold Th2, and STOPCOUNTER expresses the number of successive frames in which the utterance ratio talk$_{ratio}$(n) is larger than the threshold Th2. At the start of a call, STARTCOUNTER and STOPCOUNTER are set to zero.

After step S103, the voice recognition execution determining unit 13 determines whether an UPLINKSTOP flag indicating that voice recognition for an uplink voice signal is being stopped is being set or not (step S104). In the present embodiment, until the lapse time since start of a call becomes the threshold Th1 or larger, an uplink voice signal is an object of the voice recognition as long as it is included in the first utterance period. Consequently, the UPLINKSTOP flag is not set at the time of start of a call.

When the UPLINKSTOP flag is being set, i.e. voice recognition on an uplink voice signal is being stopped (Yes in step S104), the voice recognition execution determining unit 13 determines whether STARTCOUNTER is equal to or larger than threshold Th3 (step S105). The threshold Th3 is set to the number of frames, such as 100, so that frequent change in whether or not a frame is an object of voice recognition can be suppressed. When STARTCOUNTER is less than the threshold Th3 (No in step S105), the voice recognition execution determining unit 13 sets a voice recognition non-target flag for the present frame (step S113). On the other hand, when STARTCOUNTER is equal to or larger than the threshold Th3 (Yes in step S105), the voice recognition execution determining unit 13 unsets the UPLINKSTOP flag (step S106).

After step S106 or when the UPLINKSTOP flag is not being set in step S104 (No in step S104), the voice recognition execution determining unit 13 compares the start time of the present frame with the start time and end time of the first utterance period stored in the storage unit 5. The voice recognition execution determining unit 13 determines whether the present frame is included in the first utterance period or not (step S107). When the present frame is not included in the first utterance period (No in step S107), the first speaker does not talk in the present frame, so that the voice recognition execution determining unit 13 sets the voice recognition non-target flag for the present frame (step S113).

On the other hand, when the present frame is included in the first utterance period (Yes in step S107), the voice recognition execution determining unit 13 determines whether time length from the start time of the first utterance period including the present frame until the present frame is equal to or less than a threshold Th5 (step S108). When the time length from the start time of the first utterance period until the present frame is longer than the threshold Th5 (No in step S108), the voice recognition execution determining unit 13 sets the voice recognition non-target flag for the present frame (step S113). As described above, in a harmful call, the frequency that a victim replies is high and, as a result, each of the first utterance periods is short. Consequently, there is high possibility that a keyword to be detected is included in a predetermined period since the first utterance period starts. The threshold Th5 is therefore set to the predetermined period, for example, 1 second to 2 seconds.

On the other hand, when the time length from the start time of the first utterance period to the present frame is equal to or less than the threshold Th5 (Yes in step S108), the voice recognition execution determining unit 13 sets a voice recognition target flag to the present frame (step S109).

When the lapse time is less than the threshold Th1 in step S101 (No in step S101), the voice recognition execution determining unit 13 executes processes in step S107 and subsequent steps.

When the utterance ratio talk$_{ratio}$(n) is higher than the threshold Th2 in step S102 (No in step S102), the voice recognition execution determining unit 13 increments STOPCOUNTER by one and resets STARTCOUNTER to zero (step S110). The voice recognition execution determining unit 13 determines whether STOPCOUNTER is equal to or larger than the threshold Th4 or not (step S111). The threshold Th4 is set to the number of frames, such as 100, so that frequent change in whether or not a frame is an object of voice recognition can be suppressed. When STOPCOUNTER is less than the threshold Th4 (No in step S111), the voice recognition execution determining unit 13 executes processes in step S107 and subsequent steps.

On the other hand, when STOPCOUNTER is equal to or larger than the threshold Th4 (Yes in step S111), there are consecutive frames, the number of which is equal to a predetermined number or more, and in which the utterance ratio talk$_{ratio}$(n) of the first speaker is higher than the threshold Th2. Consequently, the possibility that the call is not a harmful call is high. The voice recognition execution determining unit 13 sets an UPLINKSTOP flag (step S112). The voice recognition execution determining unit 13 sets the voice recognition non-target flag to the present frame (step S113).

After the step S109 or S113, the voice recognition execution determining unit 13 finishes voice recognition execution determining process on the uplink voice signal.

Figure 6:
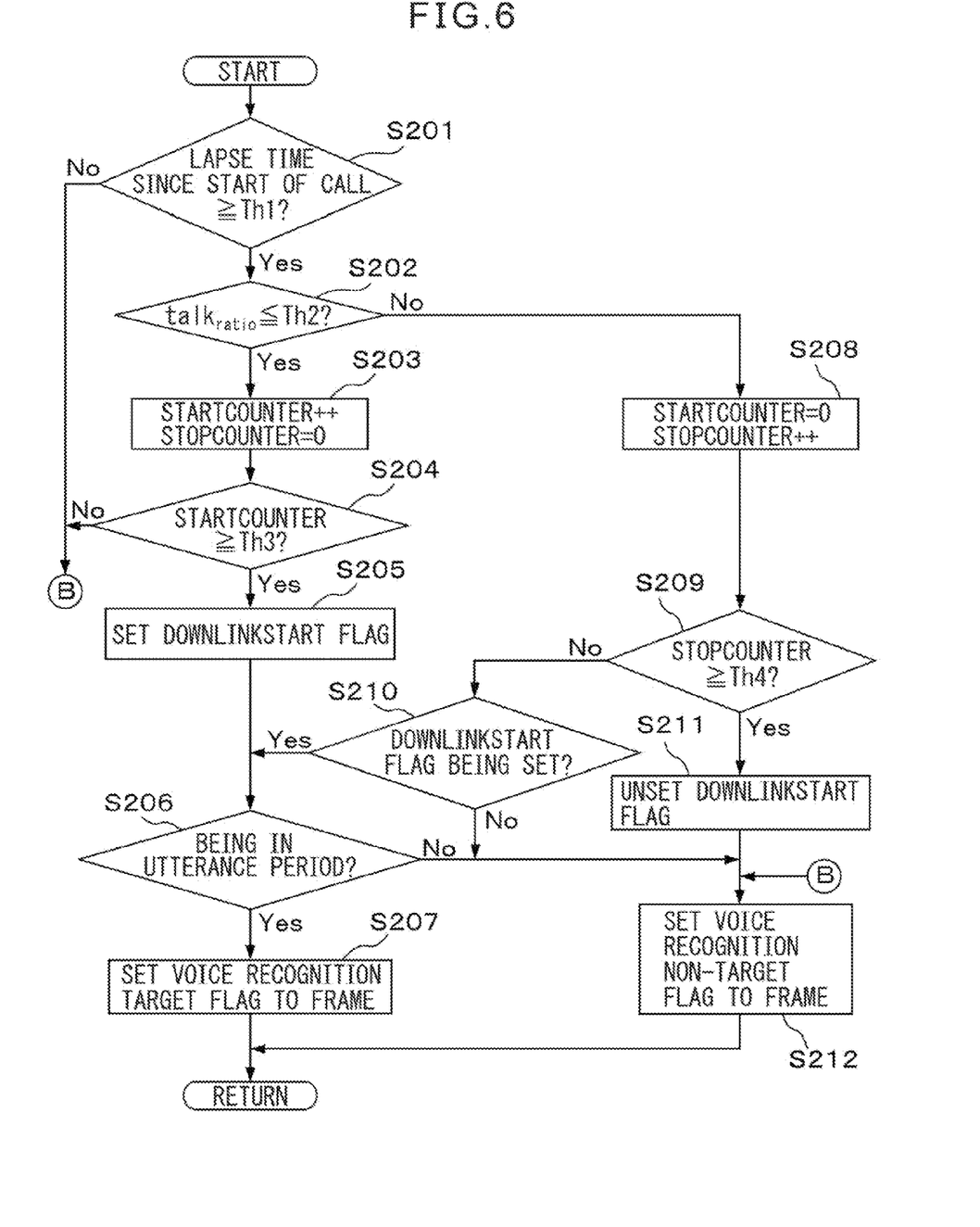
FIG. 6 is an operation flowchart of voice recognition execution determining process on a downlink voice signal, executed by the voice recognition execution determining unit.

FIG. 6 is an operation flowchart of voice recognition execution determining process on a downlink voice signal, executed by the voice recognition execution determining unit 13. The voice recognition execution determining unit 13 determines whether the voice recognition is executed or not on the frame unit basis in accordance with the operation flowchart.

The voice recognition execution determining unit 13 determines whether lapse time since the start of a call becomes equal to or longer than the threshold Th1 or not (step S201). When the lapse time is less than the threshold Th1 (No in step S201), the voice recognition execution determining unit 13 sets a voice recognition non-target flag to the present frame (step S212).

On the other hand, when the lapse time is equal to or longer than the threshold Th1 (Yes in step S201), the voice recognition execution determining unit 13 determines whether the utterance ratio talk$_{ratio}$(n) of the first speaker is equal to or less than threshold Th2 (step S202). When the utterance ratio talk$_{ratio}$(n) is equal to or less than the threshold Th2 (Yes in step S202), the voice recognition execution determining unit 13 increments STARTCOUNTER by one and resets STOPCOUNTER to zero (step S203). The voice recognition execution determining unit 13 determines whether STARTCOUNTER is equal to or larger than the threshold Th3 (step S204). When STARTCOUNTER is less than the threshold Th3 (No in step S204), the voice recognition execution determining unit 13 sets the voice recognition non-target flag to the present frame (step S212). On the other hand, when STARTCOUNTER is equal to or larger than the threshold Th3 (Yes in step S204), the voice recognition execution determining unit 13 sets a DOWNLINKSTART flag expressing that the voice recognizing process is executed on the downlink voice signal (step S205).

After that, the voice recognition execution determining unit 13 compares the start time of the present frame with the start time and end time of the second utterance period stored in the storage unit 5, thereby determining whether the present frame is included in the second utterance period or not (step S206). When the present frame is not included in the second utterance period (No in step S206), the second speaker does not talk in the present frame, so that the voice recognition execution determining unit 13 sets the voice recognition non-target flag to the present frame (step S212).

On the other hand, when the present frame is included in the second utterance period (Yes in step S206), the voice recognition execution determining unit 13 sets the voice recognition target flag to the present frame (step S207).

When the utterance ratio talk$_{ratio}$(n) is higher than the threshold Th2 in step S202 (No in step S202), the voice recognition execution determining unit 13 increments STOPCOUNTER by one and resets STARTCOUNTER to zero (step S208). The voice recognition execution determining unit 13 determines whether STOPCOUNTER is equal to or larger than the threshold Th4 (step S209). When STOPCOUNTER is less than the threshold Th4 (No in step S209), the voice recognition execution determining unit 13 determines whether a DOWNLINKSTART flag is being set or not (step S210). When the DOWNLINKSTART flag is being set, i.e., when the voice recognizing process on the downlink voice signal is being executed, the voice recognition execution determining unit 13 executes processes in step S206 and subsequent steps.

On the other hand, when STOPCOUNTER is equal to or larger than the threshold Th4 (Yes in step S209), a predetermined number of frames in which the utterance ratio talk$_{ratio}$(n) of the first speaker is higher than the threshold Th2 continue. Consequently, the possibility that the call is not a harmful call is high. Therefore, the voice recognition execution determining unit 13 unsets a DOWNLINKSTART flag (step S211). The voice recognition execution determining unit 13 sets the voice recognition non-target flag to the present frame (step S212).

After the step S207 or S212, the voice recognition execution determining unit 13 finishes voice recognition execution determining process on the downlink voice signal.

The lapse time, the utterance ratio talk$_{ratio}$, START-COUNTER, and STOPCOUNTER are common to the uplink voice signal and the downlink voice signal. The voice recognition execution determining unit 13 may perform steps S201 to S203 and step S209 in the voice recognition execution determining process on the downlink voice signal in common with the steps S101 to S103 and step S110 in the voice recognition execution determining process on the uplink voice signal.

In a modification, when the utterance ratio talk$_{ratio}$(n) of the first speaker becomes higher than the threshold Th2 in a certain frame, the voice recognition execution determining unit 13 may immediately stop the voice recognizing process on the first and second voice signals in the frame and subsequent frames. On the contrary, when the utterance ratio talk$_{ratio}$(n) of the first speaker becomes equal to or lower than the threshold Th2 in a certain frame, the voice recognition execution determining unit 13 may immediately start the voice recognizing process on the first and second voice signals in the frame and subsequent frames. In this case, steps S103, S105, S110, and S111 in the voice recognition execution determining process for the uplink voice signal are omitted. Steps S203, S204, S208, and S209 in the voice recognition execution determining process for the downlink voice signal are also omitted.

Further, the threshold Th2 for the utterance ratio when the first and second voice signals are target of the voice recognizing process may be set higher than that when the first and second voice signals are not target of the voice recognizing process. By the setting, the voice recognition execution determining unit 13 can prevent repetition of a change in a short period, between a state in which the first and second voice signals become the target of the voice recognizing process and a state in which the first and second voice signals become the non-target of the voice recognizing process.

As another modification, the voice recognition execution determining unit 13 may also determine whether the uplink voice signal is set as the target of voice recognition in accordance with the voice recognition execution determining process for the downlink voice signal illustrated in FIG. 6.

The voice recognition execution determining unit 13 notifies the voice recognizing unit 14 of the voice recognition target flag or the voice recognition non-target flag which is set on the frame unit basis, for each of the uplink voice signal and the downlink voice signal.

The voice recognizing unit 14 executes the voice recognizing process on a frame in which the voice recognition target flag is set for each of the uplink voice signal and the downlink voice signal to detect a keyword having high possibility of presence in a harmful call.

In the present embodiment, the voice recognizing unit 14 detects a keyword by using a word dictionary in which one or more keywords to be recognized are registered and an acoustic model which is generated in advance. A keyword for the uplink voice signal and a keyword for the downlink voice signal may be different from each other. For example, as keywords for the uplink sound signal, a word or a segment having high possibility that it is uttered by a victim in a harmful call such as "yes" or "I did" can be set. On the other hand, as keywords for the downlink voice signal, a word or a segment having high possibility that it is uttered by a victimizer in a harmful call such as "hurry", "remit", "account number", or "personal identification number" can be set.

The acoustic model is generated by, for example, dividing the pronunciation of a word by unit sound such as phoneme or syllabic sound and connecting unit acoustic models corresponding to the unit sounds in accordance with the order of the unit sounds, and stored in the storage unit 5 in advance. The unit acoustic model and the acoustic model are expressed by, for example, a hidden Markov model (HMM).

The voice recognizing unit 14 extracts, for example, a feature parameter used for the voice recognition from a frame to be recognized. For this purpose, the voice recognizing unit 14 obtains, for example, the spectrum of each frame by converting a signal to a signal in the frequency domain by using the FFT or MDCT. On the basis of the spectrum, the voice recognizing unit 14 obtains, as a feature parameter, for example, a Mel frequency cepstral coefficient (MFCC) for each frame. Alternately, the voice recognizing unit 14 obtains the differential value between powers of successive frames. When calculating the MFCC as the feature parameter, for example, the voice recognizing unit 14 converts the spectrum of each frame to a power value in Mel scale, and frequency conversion such as MDCT is performed again on the logarithm of the power value, thereby calculating the MFCC. When obtaining the differential value of the powers among frames as the feature parameter, for example, the voice recognizing unit 14 obtains the sum of squares of spectrums in frequency domains of frames as a power and obtains the difference of powers between successive two frames, thereby obtaining the differential value.

The voice recognizing unit 14 may extract, as a feature parameter, any of other various feature parameters (for example, fundamental frequency) used for the voice recognition using the acoustic model. The voice recognizing unit 14 may extract a plurality of kinds of feature parameters from frames as targets of the voice recognition.

The voice recognizing unit 14 calculates, as the degree of similarity, the probability or likelihood of estimating one or more frames as a specific unit sound on the basis of one or more feature parameters extracted from the frames to be recognized in the uplink voice signal or the downlink voice signal by using the HMM expressing the unit acoustic model. The voice recognizing unit 14 obtains the degrees of similarity between feature parameters of voice signal and acoustic model expressing keyword in the word dictionary generated by connecting respective the unit acoustic model. The voice recognizing unit 14 detects a keyword having the highest degree of similarity which is equal to or higher than a predetermined threshold.

The voice recognizing unit 14 may detect a keyword by another voice recognition method such as the dynamic time warping method.

Each time a keyword is detected with respect to an uplink voice signal, the voice recognizing unit 14 reads an uplink keyword counter expressing the total number of keywords detected from the uplink voice signal from the storage unit 5 and increments the uplink keyword counter by one. Each time the uplink keyword counter is incremented by one, the voice recognizing unit 14 writes the uplink keyword counter into the storage unit 5. Similarly, each time a keyword is detected with respect to a downlink voice signal, the voice recognizing unit 14 reads a downlink keyword counter expressing the total number of keywords detected from the downlink voice signal from the storage unit 5 and increments the downlink keyword counter by one. Each time the downlink keyword counter is incremented by one, the voice recognizing unit 14 writes the downlink keyword counter into the storage unit 5.

The specific call determining unit 15 determines whether a call is a harmful call or not. For the determination, the specific call determining unit 15 calculates, for example, an estimation value indicative of likelihood of a harmful call by the following equation, $$e(n) = \alpha\left(\frac{C_{up}(n)}{sum_{user}(n)}\right) + (1-\alpha)\frac{C_{down}}{sum_{party}(n)} \quad (2)$$

where "n" denotes the number of frames from the start of a call to the present frame, and e(n) denotes an evaluation value of the present frame. $sum_{user}(n)$ denotes sum of the first utterance periods by the first speaker from the start of the call to the present frame, and $sum_{party}(n)$ denotes sum of the second utterance periods by the second speaker from the start of the call to the present frame. $C_{up}(n)$ and $C_{down}(n)$ denote the value of the uplink keyword counter and the value of the downlink keyword counter, respectively, from the start of the call to the present frame. α denotes a coefficient and is set to, for example, 50.

When the evaluation value e(n) is less than a predetermined determination threshold, the specific call determining unit 15 determines that the call is not a harmful call at the time of the present frame. On the other hand, when the evaluation value e(n) is equal to or larger than the determination threshold, the specific call determining unit 15 determines that the call is a harmful call. The specific call determining unit 15 makes the user interface unit 6 display a warning message indicating that the call may be a harmful call. The determination threshold is set to, for example, 0.5 to 1.

Figure 7:
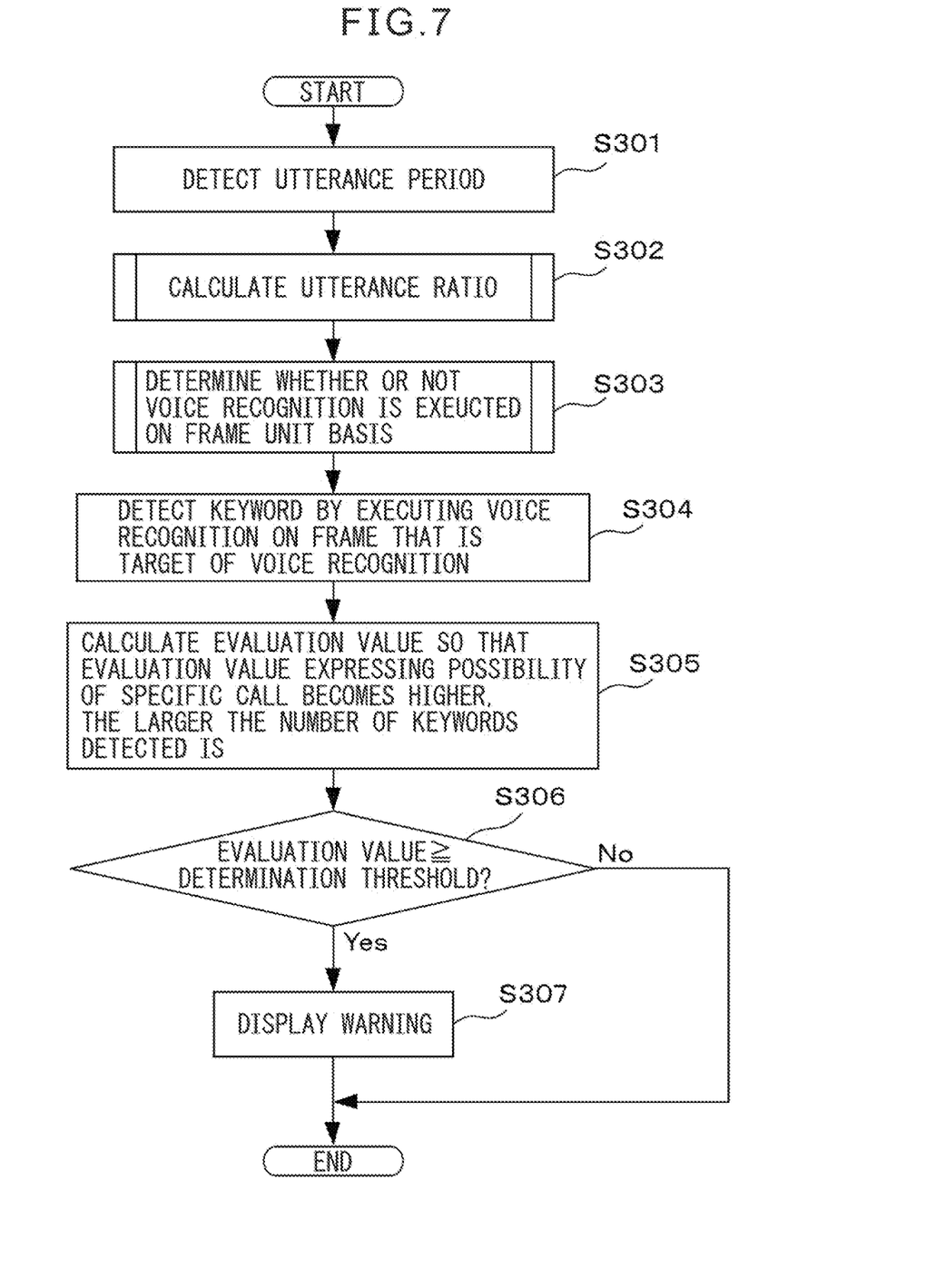
FIG. 7 is an operation flowchart of specific call detecting process.

FIG. 7 is an operation flowchart of the specific call detecting process. The processing unit 7 determines whether the call is a harmful call or not on the frame unit basis until the call is determined as a harmful call in accordance with the operation flowchart.

The utterance period detecting unit 11 detects utterance periods of the first and second speakers from the uplink voice signal and the downlink voice signal (step S301). The utterance ratio calculating unit 12 calculates the utterance ratio of the first speaker in the call from the start of the call to the present time point on the basis of the utterance periods of the each speaker (step S302).

The voice recognition execution determining unit 13 determines whether the voice recognition is to be executed or not with respect to each of the uplink voice signal and the downlink voice signal on the basis of the lapse time since the start of the call and the utterance ratio of the first speaker (step S303). The voice recognizing unit 14 executes the voice recognition on a frame as a target of the voice recognition, thereby detecting a keyword (step S304).

The specific call determining unit 15 calculates an evaluation value indicative of possibility of a specific call so that the larger the number of keywords detected is, the higher the evaluation value is (step S305). The specific call determining unit 15 determines whether the evaluation value is equal to or larger than the determination threshold (step S306). When the evaluation value is less than the determination threshold (No in step S306), the specific call determining unit 15 determines that the possibility that the call is not a harmful call at this time point is high. The specific call determining unit 15 notifies the processing unit 7 of the determination result. After that, the processing unit 7 finishes the specific call detecting process.

On the other hand, when the evaluation value is equal to or larger than the determination threshold (Yes in step S306), the specific call determining unit 15 determines that the call is a harmful call. The specific call determining unit 15 makes the user interface unit 6 display a warning message indicating that the call may be a harmful call (step S307). After that, the processing unit 7 finishes the specific call detecting process.

As described above, the specific call detecting device evaluates the possibility that a call is a harmful call on the basis of the utterance ratio of a first speaker who may be a victim and, when the possibility that the call is a harmful call is low, stops the voice recognizing process. The process loads for calculation of the utterance ratio and for determination of whether the voice recognition is to be executed or not are lighter than load of the voice recognizing process. Consequently, the specific call detecting device can reduce voice data which is the target of the voice recognizing process and therefore can reduce the process load. When the possibility that a call is a harmful call is high, the specific call detecting device performs the voice recognizing process on the downlink voice signal or the uplink voice signal to detect a keyword related to a harmful call and uses the detection result for determination whether the call is a harmful call or not. Consequently, the specific call detecting device can suppress deterioration in precision of detecting a harmful call.

Next, a specific call detecting device according to a second embodiment will be described. The specific call detecting device according to the second embodiment determines whether the first speaker enters an abnormal psychological state or not on the basis of the uplink voice signal. When the psychological state of the first speaker is abnormal, the specific call detecting device can determine that the call is a specific call more easily than the case where the psychological state is not abnormal. Also in the second embodiment, a specific call to be detected is a harmful call.

Like the specific call detecting device according to the first embodiment, the specific call detecting device according to the second embodiment is installed, for example, as a part of the functions of a processing unit of a telephone. Hereinafter, a processing unit of a telephone in which the specific call detecting device is installed will be described. With respect to the other components of the telephone, refer to the description of the corresponding components of the telephone in which the specific call detecting device according to the first embodiment is installed.

Figure 8:
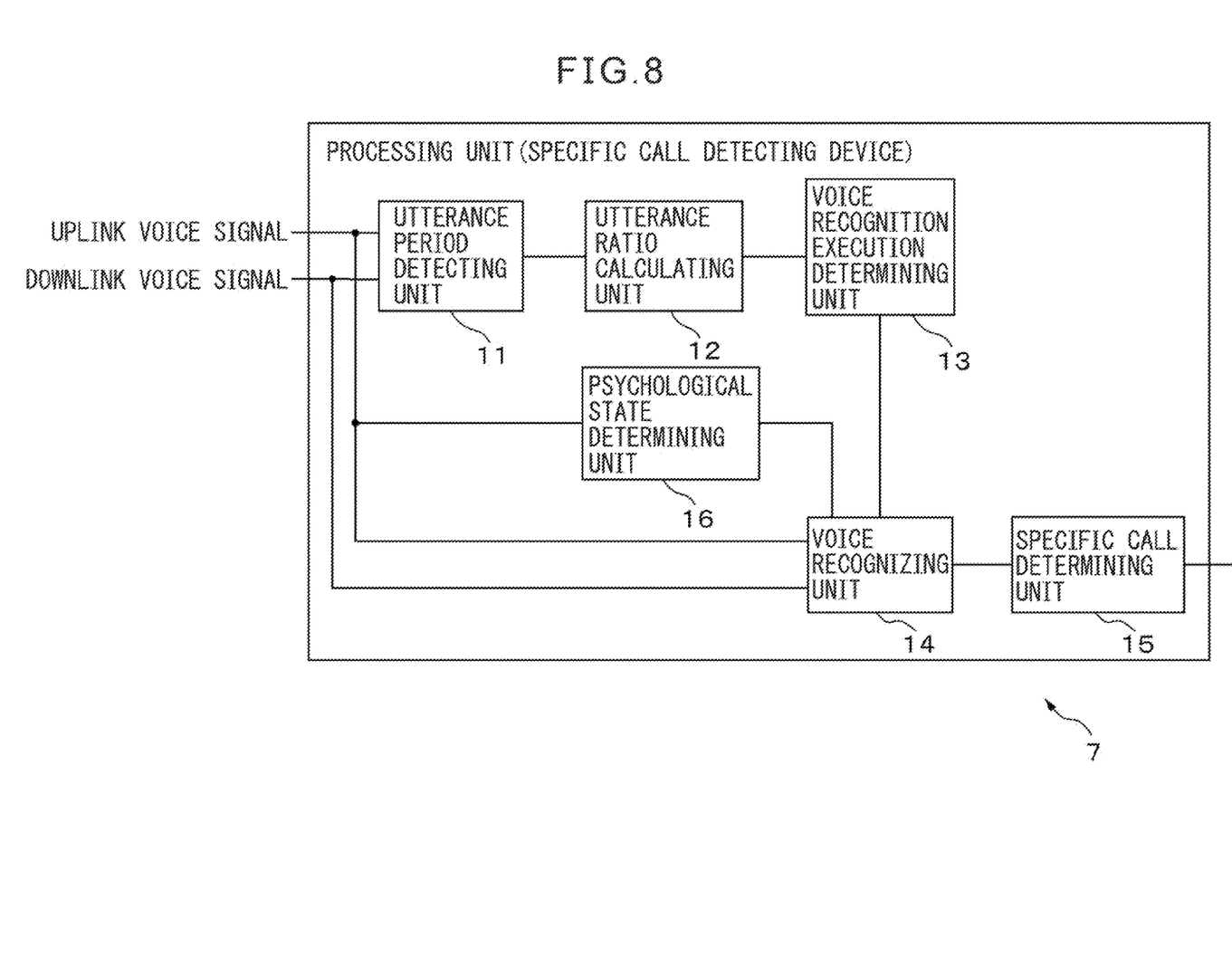
FIG. 8 is a functional block diagram of a processing unit of a telephone in which a specific call detecting device according to a second embodiment is installed.

FIG. 8 is a functional block diagram of the processing unit of the telephone in which the specific call detecting device according to the second embodiment. The processing unit 7 includes the utterance period detecting unit 11, the utterance ratio calculating unit 12, the voice recognition execution determining unit 13, the voice recognizing unit 14, the specific call determining unit 15, and a psychological state determining unit 16. In FIG. 8, to the components, the same reference numerals as those of the corresponding components of the processing unit illustrated in FIG. 2 are designated. Hereinafter, the psychological state determining unit 16 which is not included in the specific call detecting device according to the first embodiment and its related parts will be described.

The psychological state determining unit 16 extracts at least one feature parameter expressing the psychological state of the first speaker from the uplink voice signal. In the present embodiment, the psychological state determining unit 16 extracts power and pitch of voice as feature parameters for each of the frames included in the first utterance period.

For example, to obtain the power of voice, the psychological state determining unit 16 obtains the frequency spectrum by frequency-transforming the uplink voice signal using the time frequency transform such as FFT or MDCT for each of frames included in the first utterance period. The psychological state determining unit 16 obtains, as power of voice, the means square value of the amplitude of the spectrum of the frequency band corresponding to human voice, in the frequency spectrum.

The psychological state determining unit 16 may obtain an autocorrelation function by performing inverse Fourier transform on the square of the spectrum with respect to each of the frames of the uplink voice signal included in the first utterance period. The psychological state determining unit 16 may obtain, as a pitch interval, time difference (except for zero) as the first peak of the autocorrelation function of each of the frames. Alternately, the psychological state determining unit 16 may obtain the pitch interval according to another method of obtaining the pitch interval of voice, for example, the cepstrum method.

The psychological state determining unit 16 obtains variance of the power of voice and variance of the pitch interval with respect to each of the frames included in the first utterance period, from the start of a call to the present frame. For example, by the following equation, the psychological state determining unit 16 calculates the distance from a set of the variance of the power of the voice and the variance of the pitch interval to a set of a reference value of the variance of the power of the corresponding voice and a reference value of the variance of the pitch interval when the psychological state is normal. The reference value of variance of the power of the voice and the reference value of variance of the pitch interval are, for example, calculated as an average value of the variance of the power of the voice and an average value of the variance of the pitch interval calculated from a plurality of samples of the voice signal of speakers whose psychological state is normal.

$$d(n) = \sqrt{(\sigma_{pitch}(n) - \sigma_{pitchref})^2 + (\sigma_{power}(n) - \sigma_{powerref})^2} \quad (3)$$

where "n" denotes the number of frames from the start of a call to the present frame, and $\sigma_{pitch}(n)$ and $\sigma_{power}(n)$ denote variance of the pitch interval and variance of power, respectively, from the start of a call to the present frame. $\sigma_{pitchref}$ and $\sigma_{powerref}$ denote a reference value of variance of the pitch interval and a reference value of variance of power, respectively. d(n) denotes the distance in a present frame.

The psychological state determining unit 16 may extract, as feature parameters, statistic amounts of time fluctuation degree of tempo, intonation, and a predetermined frequency component. The psychological state determining unit 16 may obtain variance of the feature parameters and calculate the square root of sum of squares of the differences between the variance of the feature parameters and the reference values of the variance s of the feature parameters respectively as the distance, like the pitch interval and the power of voice.

The psychological state determining unit 16 obtains the average value of the distances d(j) on the basis of a plurality of distances d(j) (j=1, 2, . . . , n) calculated with respect to frames included in the first utterance period, in present and past frames. When the psychological state of the first speaker is normal, the average value is a relatively small value. On the other hand, when the psychological state of the first speaker is abnormal, the average value is a relatively large value. Consequently, the psychological state determining unit 16 compares the average value of the distances d(j) with a predetermined determination value. When the average value is larger than the determination value, the psychological state determining unit 16 determines that the psychological state of the first speaker is abnormal. On the other hand, when the average value of the distances is equal to or less than the determination value, the psychological state determining unit 16 determines that the psychological state of the first speaker is normal. The determination value is, for example, experimentally determined in advance and stored in the storage unit 5.

Each time the psychological state of the first speaker is determined, the psychological state determining unit 16 notifies the voice recognizing unit 14 of the determination result. The psychological state determining unit 16 notifies the voice recognizing unit 14 of the average value of the distances d(j) as an abnormality degree indicating the degree of abnormality of the psychological state of the first speaker.

On the basis of the result of the determination of whether the psychological state of the first speaker is abnormal or not, the voice recognizing unit 14 changes the threshold for keyword detection or the kind of a keyword to be detected. For example, when the second speaker is a victimizer who tries to carry out a fraud to the first speaker, sometimes, the second speaker applies psychological pressure to the first speaker. Consequently, in a harmful call, there is a case that it is difficult for the first speaker to maintain his/her psychological state calm. Consequently, by causing a keyword to be easily detected when the psychological state of the first speaker is abnormal, the specific call detecting device can improve the precision of detecting a harmful call.

For example, when it is determined that the psychological state of the first speaker is abnormal, in order to more easily detect a keyword, the threshold for the degree of similarity calculated for each of the keywords is set smaller than that when it is determined that the psychological state of the first speaker is normal. In addition, the voice recognizing unit 14 may set the threshold to smaller, as the abnormality degree received from the psychological state determining unit 16 is larger.

The voice recognizing unit 14 may set a keyword shorter than a keyword to be detected when it is determined that the psychological state of a first speaker is normal as a keyword to be detected when it is determined that the psychological state of the first speaker is abnormal.

Generally, the longer a keyword is, the probability that another word similar to the keyword appears during a call decreases. Consequently, the possibility that another word is detected by mistake as a keyword decreases. However, the longer a keyword is, the number of feature parameters for detecting the word as the keyword increases, and the possibility of failing to detect the keyword appearing during a call increases. On the contrary, the shorter a keyword is, the number of feature parameters for detecting the word as a keyword decreases, but the possibility of detecting the keyword appearing in a call is high, and the possibility of erroneously detecting another word in a call as the keyword is also high.

Consequently, when it is determined that the psychological state of the first speaker is normal as described above, by setting only a relatively long keyword as an object of detection, the voice recognizing unit 14 can prevent a keyword from being erroneously detected. By adding a relatively short keyword as an object of detection when it is determined that the psychological state of the first speaker is abnormal, detection of a keyword useful to detect a harmful call is facilitated.

For example, in the word dictionary stored in the storage unit 5, together with a plurality of keywords, the number of syllabic sounds included in each keyword is also registered. When it is determined that the psychological state of the first speaker is normal, the voice recognizing unit 14 selects only a keyword having syllabic sounds more than predetermined number of syllabic sounds from the plurality of keywords registered in the word dictionary. On the other hand, when it is determined that the psychological state of the first speaker is abnormal, the voice recognizing unit 14 selects, as objects to be detected, not only the keyword having syllabic sounds more than the predetermined number of syllabic sounds but also a keyword having syllabic sounds less than the predetermined number of syllabic sounds. For example, the voice recognizing unit 14 retrieves a keyword to be detected from each of second utterance periods of a downlink voice signal. For example, the predetermined number of syllabic sounds can be set to five. For example, keywords each having five or more syllabic sounds can be set to "ko-u-za-ba-n-go" (account number), "yu-u-bi-n-kyo-ku" (post office), and "kya-shu-ka-a-do" (cash card). The keywords each having less than five syllabic sounds can be set to, for example, "fu-ri-ko-mi" (remittance), "gi-n-ko-u" (bank), "i-so-i-de" (hurry), and "ke-i-sa-tsu" (police).

As described above, the specific call detecting device according to the second embodiment changes the condition of detecting keywords in accordance with the psychological state of the first speaker determined on the basis of the uplink voice signal. Consequently, the specific call detecting device can improve the detection precision of a specific call.

As a modification, when it is determined that the psychological state of the first speaker is abnormal, the specific call detecting device may ease conditions of setting an object of voice recognition for at least one of the uplink voice signal and the downlink voice signal. For example, the voice recognition execution determining unit 13 may set a threshold Th2 to be compared with the utterance ratio when it is determined that the psychological state of the first speaker is abnormal to be larger than the threshold Th2 when it is determined that the psychological state of the first speaker is normal. For example, when it is determined that the psychological state of the first speaker is normal, Th2 can be set to 0.3. On the other hand, when it is determined that the psychological state of the first speaker is abnormal, Th2 can be set to 0.4.

Alternatively, the voice recognition execution determining unit 13 may set a threshold Th3 to be compared with START-COUNTER when it is determined that the psychological state of the first speaker is abnormal to be smaller than the threshold Th3 when it is determined that the psychological state of the first speaker is normal. The voice recognition execution determining unit 13 may set a threshold Th4 to be compared with STOPCOUNTER when it is determined that the psychological state of the first speaker is abnormal to be larger than the threshold Th4 when it is determined that the psychological state of the first speaker is normal. For example, when it is determined that the psychological state of the first speaker is normal, Th3=Th4=100 can be set. On the other hand, when it is determined that the psychological state of the first speaker is abnormal, Th3=50 and Th4=200 can be set.

Therefore, when it is determined that the psychological state of the first speaker is abnormal, the specific call detecting device can make the utterance period as a target of voice recognition longer, so that the possibility of detecting larger number of keywords can be improved. As a result, the specific call detecting device can improve the precision of detecting a specific call.

As another modification, the specific call detecting device may determine whether a call is a harmful call or not on the basis of only the uplink voice signal. In this case, the utterance period detecting unit 11 detects the first utterance period of the first speaker from the uplink voice signal but does not detect the second utterance period of the second speaker from the downlink voice signal. The utterance ratio calculating unit 12 calculates the utterance ratio $talk_{ratio}(n)$ of the first speaker in accordance with the following equation, $$talk_{ratio}(n) = \frac{sum_{user}(n)}{p_{total}(n)} \quad (4)$$

where "n" denotes the number of frames since start of a call until the present frame, $p_{total}(n)$ denotes call time since start of a call until the present frame, and $sum_{user}(n)$ denotes sum of the first utterance periods since start of a call until the present frame.

In the modification, the voice recognition execution determining unit 13 executes the voice recognition execution determining process on the uplink voice signal in accordance with the operation flowchart illustrated in FIG. 5 but does not perform the voice recognition execution determining process on the downlink voice signal. The voice recognizing unit 14 executes the voice recognizing process on the frames included in the first utterance period as a target of the voice recognizing process to thereby detect a keyword included in the uplink voice signal. The specific call determining unit 15 calculates an evaluation value e(n) indicative of probability of a harmful call, for example, by the following equation, $$e(n) = \beta\left(\frac{C_{up}(n)}{sum_{user}(n)}\right) + (1 - \beta)(1 - talk_{ratio}(n)) \quad (5)$$

where $C_{up}(n)$ denotes the value of the uplink keyword counter at the time point of completion of the voice recognizing process for frames until the present frame, i.e., total number of keywords detected from the uplink voice signal from the start of a call to the present frame. β denotes a coefficient and is set to, for example, 0.5.

Further, in the modification, when it is determined whether the psychological state of the first speaker is abnormal or not on the basis of the uplink voice signal, the specific call determining unit 15 may calculate, for example, the evaluation value e(n) by the following equation, $$e(n) = \alpha\left(\frac{a(n)}{a_{max}}\right) + \beta\left(\frac{C_{up}(n)}{sum_{user}(n)}\right) + \gamma(1 - talk_{ratio}(n)) \quad (6)$$

where a(n) denotes the abnormality degree in the present frame, and $a_{max}$ denotes the maximum value of the value of the degree of abnormality. α, β, and γ are coefficients and can be set to, for example, 0.4, 0.3, and 0.3, respectively.

According to the modification, voice data as a target of voice recognition is limited to the uplink voice signal, so that the specific call detecting device can further reduce the process load of the voice recognition.

In still another modification, the specific call to be detected is not limited to a harmful call. The specific call may be a call in which the utterance ratio of any one of speakers is equal to or less than a specific threshold (for example, 0.2 to 0.3) or is equal to or higher than a specific threshold (0.7 to 0.8). For example, the specific call may be a call between a user of a product and an operator in a support center of the product, the user being a complainer. Also when a user is a complainer, the utterance ratio of the operator who is talking the user tends to be much lower than 0.5. The reason is that the user mentions various things during a call whereas the operator utters specific words such as "yes" and "sorry". In this case, the specific call detecting device is installed, for example, in a telephone used by the operator. The specific call detecting device may be installed in a computer which reads voice data of a call between the operator and the user and analyzes the voice data. The operator corresponds to the first speaker, and the user corresponds to the second speaker.

A computer program for making a computer realize the functions of the processing unit of the specific call detecting device according to any of the embodiments and modifications may be provided in a form that it is recorded in a computer-readable medium such as a magnetic recording medium or an optical recording medium. Carrier waves are not included in the computer-readable medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. A specific call detecting device comprising:
   an utterance period detecting unit which detects at least a first utterance period in a call between a first speaker and a second speaker, from among the first utterance period in which the first speaker speaks from a first voice uttered by the first speaker and obtained by a voice input unit, and a second utterance period in which the second speaker speaks from a second voice uttered by the second speaker;
   an utterance ratio calculating unit which calculates utterance ratio of the first speaker in the call on the basis of at least the first utterance period among the first and second utterance periods;
   a voice recognition execution determining unit which determines whether at least one of the first and second voices is to be a target of voice recognition or not on the basis of the utterance ratio;
   a voice recognizing unit which detects a keyword related to a specific call from the voice determined as a target of voice recognition among the first and second voices; and
   a determining unit which calculates an evaluation value so that the larger the number of keywords detected is, the higher the evaluation value indicative of probability of the specific call is, and when the evaluation value is equal to or higher than a predetermined threshold, determines that the call is the specific call.

2. The specific call detecting device according to claim 1, wherein the voice recognition execution determining unit determines that the first voice is a target of voice recognition until a period in which the utterance ratio is higher than a predetermined threshold, reaches a first period, and determines that the first voice is not a target of voice recognition after the period in which the utterance ratio is higher than the threshold, reaches the first period.

3. The specific call detecting device according to claim 1, wherein the voice recognition execution determining unit determines that the second voice is not a target of voice recognition until a period in which the utterance ratio is equal to or less than a predetermined threshold, reaches a second period, and determines that the second voice is a target of voice recognition after the period in which the utterance ratio is equal to or less than the threshold, reaches the second period.

4. The specific call detecting device according to claim 2, further comprising a psychological state determining unit which determines whether a psychological state of the first speaker is normal or not on the basis of the first voice,
   wherein the voice recognition execution determining unit sets value of the threshold when it is determined that the psychological state of the first speaker is not normal to be larger than value of the threshold when it is determined that the psychological state of the first speaker is normal.

5. The specific call detecting device according to claim 2, further comprising a psychological state determining unit which determines whether a psychological state of the first speaker is normal or not on the basis of the first voice,
   wherein the voice recognition execution determining unit sets the first period when it is determined that the psychological state of the first speaker is not normal to be longer than the first period when it is determined that the psychological state of the first speaker is normal.

6. The specific call detecting device according to claim 3, further comprising a psychological state determining unit which determines whether a psychological state of the first speaker is normal or not on the basis of the first voice,
   wherein the voice recognition execution determining unit sets the second period when it is determined that the psychological state of the first speaker is not normal to be shorter than the second period when it is determined that the psychological state of the first speaker is normal.

7. The specific call detecting device according to claim 2, further comprising:
   a psychological state determining unit which determines whether a psychological state of the first speaker is normal or not on the basis of the first voice; and
   a storage unit which stores, as the keywords, a first keyword having the number of syllabic sounds equal to or larger than predetermined number of syllabic sounds and a second keyword having the number of syllabic sounds less than the predetermined number of syllabic sounds,
   wherein the voice recognizing unit detects the first keyword from voice determined as a target of the voice recognition when it is determined that the psychological state of the first speaker is normal and, on the other hand, detects the first and second keywords from voice determined as a target of the voice recognition when it is determined that the psychological state of the first speaker is not normal.

8. The specific call detecting device according to claim 2, further comprising a psychological state determining unit which determines whether the psychological state of the first speaker is normal or not on the basis of the first voice,
wherein the voice recognizing unit calculates the degree of similarity between the voice determined as the target of the voice recognition and the keyword, detects the keyword when the degree of similarity is equal to or higher than a similarity threshold, and sets the value of the similarity threshold when it is determined that the psychological state of the first speaker is not normal to be smaller than the value of the similarity threshold when it is determined that the psychological state of the first speaker is normal.

9. The specific call detecting device according to claim 1, wherein the utterance period detecting unit detects both of the first utterance period and the second utterance period, and
the utterance ratio calculating unit calculates, as the utterance ratio, ratio of sum of lengths of the first utterance periods to total of sum of lengths of the first utterance periods and sum of lengths of the second utterance periods in a predetermined period of which a termination end is a present time.

10. The specific call detecting device according to claim 1, wherein the utterance period detecting unit detects only the first utterance period among the first and second utterance periods, and
the utterance ratio calculating unit calculates, as the utterance ratio, ratio of sum of lengths of the first utterance periods, to a predetermined period of which a termination end is a present time.

11. The specific call detecting device according to claim 1, wherein the lower the utterance ratio is, the more the determining unit increases the evaluation value.

12. The specific call detecting device according to claim 1, wherein the specific call is a harmful call intended by the second speaker to victimize the first speaker.

13. A specific call detecting method comprising:
in a call between a first speaker and a second speaker, detecting at least a first utterance period, from among the first utterance period in which the first speaker speaks from first voice uttered by the first speaker and obtained by a voice input unit, and a second utterance period in which the second speaker speaks from a second voice uttered by the second speaker;
calculating utterance ratio of the first speaker in the call on the basis of at least the first utterance period among the first and second utterance periods;
determining whether at least one of the first and second voices is to be a target of voice recognition or not on the basis of the utterance ratio;
detecting a keyword related to a specific call from the voice determined as a target of voice recognition among the first and second voices; and
calculating an evaluation value so that the larger the number of keywords detected is, the higher the evaluation value indicative of probability of the specific call is, and when the evaluation value is equal to or higher than a predetermined threshold, determining that the call is the specific call.

14. The specific call detecting method according to claim 13, wherein the determining whether at least one of the first and second voices is to be a target of voice recognition or not, determines that the first voice is a target of voice recognition until a period in which the utterance ratio is higher than a predetermined threshold, reaches a first period, and determines that the first voice is not a target of voice recognition after the period in which the utterance ratio is higher than the threshold, reaches the first period.

15. The specific call detecting method according to claim 13, wherein the determining whether at least one of the first and second voices is to be a target of voice recognition or not, determines that the second voice is not a target of voice recognition until a period in which the utterance ratio is equal to or less than a predetermined threshold, reaches a second period, and determines that the second voice is a target of voice recognition after the period in which the utterance ratio is equal to or less than the threshold, reaches the second period.

16. The specific call detecting method according to claim 14, further comprising determining whether a psychological state of the first speaker is normal or not on the basis of the first voice,
wherein the determining whether at least one of the first and second voices is to be a target of voice recognition or not, sets value of the threshold when it is determined that the psychological state of the first speaker is not normal to be larger than value of the threshold when it is determined that the psychological state of the first speaker is normal.

17. The specific call detecting method according to claim 14, further comprising determining whether a psychological state of the first speaker is normal or not on the basis of the first voice,
wherein the determining whether at least one of the first and second voices is to be a target of voice recognition or not, sets the first period when it is determined that the psychological state of the first speaker is not normal to be longer than the first period when it is determined that the psychological state of the first speaker is normal.

18. The specific call detecting method according to claim 15, further comprising determining whether a psychological state of the first speaker is normal or not on the basis of the first voice,
wherein the determining whether at least one of the first and second voices is to be a target of voice recognition or not, sets the second period when it is determined that the psychological state of the first speaker is not normal to be shorter than the second period when it is determined that the psychological state of the first speaker is normal.

19. The specific call detecting method according to claim 14, further comprising:
determining unit whether a psychological state of the first speaker is normal or not on the basis of the first voice;
wherein the detecting a keyword related to a specific call, detects a first keyword having the number of syllabic sounds equal to or larger than predetermined number of syllabic sounds from voice determined as a target of the voice recognition when it is determined that the psychological state of the first speaker is normal and, on the other hand, detects the first keyword and a second keyword having the number of syllabic sounds less than the predetermined number of syllabic sounds from voice determined as a target of the voice recognition when it is determined that the psychological state of the first speaker is not normal.

20. The specific call detecting method according to claim 14, further comprising determining whether the psychological state of the first speaker is normal or not on the basis of the first voice,
wherein the detecting a keyword related to a specific call, calculates the degree of similarity between the voice determined as the target of the voice recognition and the keyword, detects the keyword when the degree of similarity is equal to or higher than a similarity threshold, and sets the value of the similarity threshold when it is determined that the psychological state of the first speaker is not normal to be smaller than the value of the similarity threshold when it is determined that the psychological state of the first speaker is normal.

21. The specific call detecting method according to claim 13, wherein the detecting at least a first utterance period, detects both of the first utterance period and the second utterance period, and the calculating utterance ratio of the first speaker, calculates, as the utterance ratio, ratio of sum of lengths of the first utterance periods to total of sum of lengths of the first utterance periods and sum of lengths of the second utterance periods in a predetermined period of which a termination end is a present time.

22. The specific call detecting method according to claim 13, wherein the detecting at least a first utterance period, detects only the first utterance period among the first and second utterance periods, and the calculating utterance ratio of the first speaker, calculates, as the utterance ratio, ratio of sum of lengths of the first utterance periods, to a predetermined period of which a termination end is a present time.

23. The specific call detecting method according to claim 13, wherein the lower the utterance ratio is, the more the calculating an evaluation value increases the evaluation value.

24. The specific call detecting method according to claim 13, wherein the specific call is a harmful call intended by the second speaker to victimize the first speaker.

25. A non-transitory computer-readable recording medium recording a computer program for detecting a specific call, which causes a computer to execute:

in a call between a first speaker and a second speaker, detecting at least a first utterance period, from among the first utterance period in which the first speaker speaks from first voice uttered by the first speaker and obtained by a voice input unit, and a second utterance period in which the second speaker speaks from a second voice uttered by the second speaker;

calculating utterance ratio of the first speaker in the call on the basis of at least the first utterance period among the first and second utterance periods;

determining whether at least one of the first and second voices is to be an object of voice recognition or not on the basis of the utterance ratio;

detecting a keyword related to a specific call from the voice determined as a target of voice recognition among the first and second voices; and calculating an evaluation value so that the larger the number of keywords detected is, the higher the evaluation value indicative of probability of the specific call is and, when the evaluation value is equal to or higher than a predetermined threshold, determining that the call is the specific call.

26. A specific call detecting device comprising:

a sound input unit which obtains, in a call between a first speaker and a second speaker, first voice uttered by the first speaker and second voice uttered by the second speaker; and a processor adapted to: detect at least a first utterance period, from among the first utterance period in which the first speaker speaks from the first voice and a second utterance period in which the second speaker speaks from the second voice;

calculate utterance ratio of the first speaker in the call on the basis of at least the first utterance period among the first and second utterance periods;

determine whether at least one of the first and second voices is to be a target of voice recognition or not on the basis of the utterance ratio;

detect a keyword related to a specific call from the voice determined as a target of voice recognition among the first and second voices; and calculate an evaluation value so that the larger the number of keywords detected is, the higher the evaluation value indicative of probability of the specific call is and, when the evaluation value is equal to or higher than a predetermined threshold, determine that the call is the specific call.

27. A telephone comprising:

a sound input unit which obtains, in a call between a first speaker and a second speaker, first voice uttered by the first speaker and second voice uttered by the second speaker;

an utterance period detecting unit which detects at least a first utterance period, from among the first utterance period in which the first speaker speaks from the first voice and a second utterance period as a period in which the second speaker speaks from the second voice;

an utterance ratio calculating unit which calculates utterance ratio of the first speaker in the call on the basis of at least the first utterance period among the first and second utterance periods;

a voice recognition execution determining unit which determines whether at least one of the first and second voices is to be a target of voice recognition or not on the basis of the utterance ratio;

a voice recognizing unit which detects a keyword related to a specific call from the voice determined as a target of voice recognition among the first and second voices;

a determining unit which calculates an evaluation value so that the larger the number of keywords detected is, the higher the evaluation value indicative of probability of the specific call is, and when the evaluation value is equal to or higher than a predetermined threshold, determines that the call is the specific call; and a display unit which displays a warning message when it is determined that the call is the specific call.

* * * * *